(12) United States Patent
Pham (10) Patent No.: US 11,423,364 B2
(45) Date of Patent: Aug. 23, 2022

(54) DEVICE AND METHOD FOR FACILITATING RECYCLING

(71) Applicant: Capital One Services, LLC, McLean, VA (US)

(72) Inventor: Vincent Pham, Champaign, IL (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

(21) Appl. No.: 16/204,341

(22) Filed: Nov. 29, 2018

(65) Prior Publication Data

US 2020/0175481 A1 Jun. 4, 2020

(51) Int. Cl.
*G06Q 10/00* (2012.01)
*G07F 19/00* (2006.01)
*G06K 7/00* (2006.01)

(52) U.S. Cl.
CPC ........... *G06Q 10/30* (2013.01); *G06K 7/0004* (2013.01); *G07F 19/21* (2013.01)

(58) Field of Classification Search
CPC ...... G06Q 10/30; G07F 19/21; G06K 7/0004; Y02W 90/00
See application file for complete search history.

(56) References Cited

U.S. PATENT DOCUMENTS

| | | | |
|---|---|---|---|
| 4,442,345 A | | 4/1984 | Mollier |
| 5,662,822 A | * | 9/1997 | Tada ................. B23K 26/0736 219/121.67 |
| 6,089,611 A | * | 7/2000 | Blank ................ B42D 15/0053 156/230 |
| 2003/0197323 A1 | * | 10/2003 | Yamamiya ........... G07F 11/045 271/11 |
| 2004/0188519 A1 | * | 9/2004 | Cassone ................ G06Q 10/02 235/382 |
| 2004/0231956 A1 | * | 11/2004 | Adams ...................... G07F 9/08 194/217 |
| 2007/0244709 A1 | * | 10/2007 | Gilbert ............... B29B 17/0042 705/308 |

(Continued)

FOREIGN PATENT DOCUMENTS

| | | | | |
|---|---|---|---|---|
| CN | 103044971 A | * | 4/2013 | ........... B42D 25/328 |
| CN | 105163024 A | * | 12/2015 | ............. H04N 5/232 |

(Continued)

OTHER PUBLICATIONS

Jay MacDonald, Are Credit Cards Recyclable? It's complicated, Nov. 8, 2017, pp. 1-4. (Year: 2017).*

(Continued)

*Primary Examiner* — Tan D Nguyen
(74) *Attorney, Agent, or Firm* — Troutman Pepper Hamilton Sanders LLP; Christopher J. Forstner; John A. Morrissett (57) ABSTRACT

The present disclosure includes a device for recycling a payment card, which can include a payment card receiver for receiving a payment card that has a substrate and an information-saving component, an image capture device configured to identify a location of the information-saving component on the substrate, a separating device configured to remove the information-saving component from the substrate, and a storage portion configured receive the substrate and the information-saving component.

16 Claims, 5 Drawing Sheets

(56) References Cited

U.S. PATENT DOCUMENTS

| | | | | |
|---|---|---|---|---|
| 2016/0282857 A1* | 9/2016 | DeVore | .................. | E02F 9/262 |
| 2019/0017863 A1* | 1/2019 | Saltzman | ............. | G01G 19/414 |

FOREIGN PATENT DOCUMENTS

| | | | | | |
|---|---|---|---|---|---|
| CN | 207281923 U | * | 4/2018 | | |
| CN | 207517084 U | * | 6/2018 | | |
| EP | 0967569 A2 | * | 12/1999 | ........... | G06K 19/077 |
| EP | 1343114 A2 | | 9/2003 | | |
| EP | 3236438 A1 | * | 10/2017 | ............. | G07F 19/00 |
| EP | 3236438 A1 | | 10/2017 | | |
| SU | 608182 A | * | 5/1978 | | |
| WO | WO-2006044363 A2 | * | 4/2006 | ......... | G07F 17/3248 |
| WO | WO-2013009050 A2 | * | 1/2013 | ............. | G06K 19/02 |

OTHER PUBLICATIONS

Mahajan, Abhishek, "Smart Card: Turning Point of Technology", International Journal of Computer Science and Mobile Computing, 2014, vol. 3, Issue 10, Oct. 2014, pp. 982-987 (Year: 2014).*

Mai Al-Sebae, "Big Issues For A Small Piece: RFID Ethical Issues", 2015, ICIT 2015 The 7th International Conference on Information Technology, pp. 351-356. (Year: 2015).*

MacDonald, "Are Credit Cards Recyclable? It's Complicated" https://www.creditcards.com/credit-card-news/are-credit-cards-recyclable.php, Nov. 8, 2017.

* cited by examiner

DEVICE AND METHOD FOR FACILITATING RECYCLING

FIELD

The present disclosure relates to devices for facilitating recycling, and, in particular, for facilitating recycling of multi-component products such as payment cards (e.g., credit cards, debit cards), identification cards, membership cards, access cards or badges, and transit cards.

BACKGROUND

When a card—such as a payment card (e.g., credit card, debit card), identification card, membership card, access card or badge, gift card, and transit card—is no longer needed or desired, users often dispose of the card in the trash. Some users may cut the card with scissors or another tool to quell security concerns, but even these cards generally end up in a landfill. While many cards include recyclable materials, recycling of cards has not generally been feasible for ordinary consumers.

One difficulty in recycling cards is determining whether a particular card includes recyclable materials. Moreover, as components of a card are typically made of differing materials, another difficulty in recycling cards is separating the various components, which may be recyclable, non-recyclable, or separately recyclable by differing recycling processes. Further, recycling certain cards may present security concerns. For example, payment cards and identification cards may include sensitive data, such as a cardholder's name, address, birthdate, financial information, or personal characteristics (e.g., sex, height, weight, hair color, eye color). Therefore, depositing a card for recycling may raise security concerns for the user. While the components including sensitive information may be destroyed prior to a user depositing the card, existing card recycling facilities may accept cards for recycling only if they are whole.

Accordingly, there is a need for devices, apparatuses, and systems to facilitate the recycling of cards. Embodiments of the present disclosure are directed to this and other considerations.

SUMMARY

Consistent with the disclosed embodiments, various methods and systems are disclosed. According to some embodiments, a device for facilitating recycling of a card is disclosed. The device can include a card receiver that is configured to receive a card and an image capture device that is configured to identify a location of an information-saving component of the card on a substrate of the card. The device can also include a separating component, such as a cutting device, a grinding device, a melting device, or another removal device, configured to remove information-saving component from the substrate and a physical storage portion that can include a first bin configured to receive the substrate and a second bin configured to receive the information-saving component. In some embodiments, the device may be a standalone device or may be incorporated into another device, such as an ATM.

According to some embodiments, a method for facilitating recycling of a card can include receiving, by a recycling receptacle, a card and automatically identifying, by an image capture device of the recycling receptacle, a first location of a first data portion of the card. The method can include, responsive to identifying the first location of the first data portion, removing, by a separating device of the recycling receptacle, the first data portion from the card and receiving, by a first bin of the recycling receptacle, the removed first data portion. In some embodiments, the method can include automatically identifying, by the image capture device, a second location of a second data portion and removing, by the separating device, the second data portion from the card. The method can include receiving, by a second bin of the recycling receptacle, the card.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The present disclosure is generally directed to devices, methods, and systems for facilitating the recycling of cards, such as payment cards (e.g., credit cards, debit cards), identification cards, membership cards, access cards or badges, gift cards, and transit cards, as well as methods for facilitating the recycling of such cards. According to some embodiments, the device can be a standalone device. In some embodiments, the device can be incorporated with, or integrated into, another device. For example, in some embodiments, the device can be a part of an ATM. In other embodiments, the device can be a part of other devices.

Figure 1:
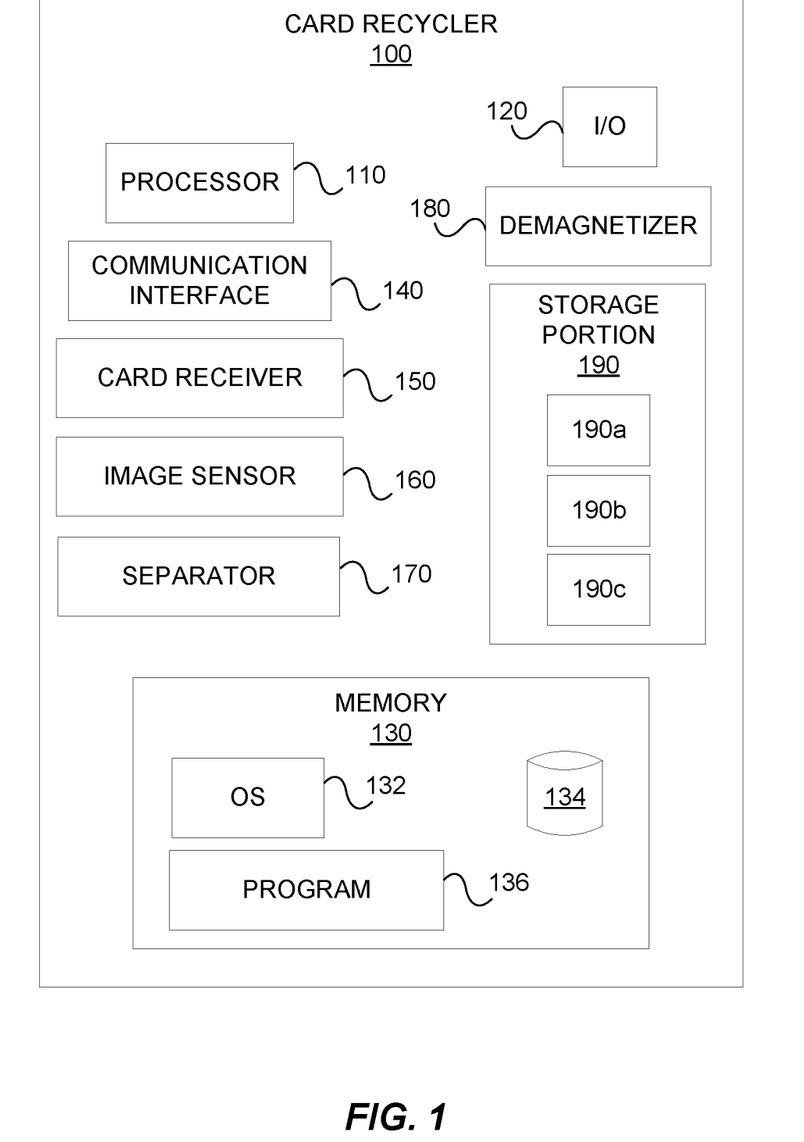
FIG. 1 is a diagram of a card recycling device, in accordance with some embodiments of the disclosed technology.

Referring now to the figures, FIG. 1 illustrates a device 100 for facilitating recycling of a card (e.g., a card recycler). The device 100 can include processor 110, input/output (I/O) device 120, memory 130, communication interface 140, card receiver 150, image sensor 160 (e.g., an image capturing device), separator 170, demagnetizer 180, and physical storage 190. One of ordinary skill will recognize that these are merely examples, and a device for facilitating card recycling according to the present disclosure may not include all the depicted elements of device 100, and/or may include various additional or alternative elements. Memory 130 may store one or more of an operating system (OS) 132, a database 134, which may be any suitable repository of data, and a program 136. Communication interface 140 may include, for example, one or more of wireless or wired transmitter, receiver, and transceiver.

In some embodiments, physical storage 190 can include one or more storage sub-portions or bins. For example, some embodiments may include one, two, three, four, five, ten, fifteen, or more bins. As a non-limiting example, FIG. 1 is depicted as include three bins 190a, 190b, 190c. In some embodiments, each bin is separated (e.g., partitioned) from all other bins. In certain embodiments, each bin 190a, 190b, 190c is configured to receive card components of a particular type or material, as described more fully below. In certain embodiments, card recycler 100 may include a user interface (U/I) device for receiving user input data, such as data representative of a click, a scroll, a tap, a press, a spatial gesture (e.g., as detected the digital camera), a voice command (e.g., as detected by the microphone), or typing on an input device that can detect tactile inputs.

In some embodiments, card receiver 150 can be configured to receive one or more types of cards. For example, card receiver 150 may be configured to receive one or more of a payment card (e.g., credit card, debit card), an identification card (e.g., a driver's license), a membership card (e.g., for a gym, for a professional organization), an access card or badge (e.g., a keycard for a workplace or other location), a gift card, or a transit card (e.g., a train pass). In some embodiments, card receiver 150 may be configured to receive cards of differing sizes. As will be understood by those having skill in the art, a card may include a substrate on which sensitive information may be printed or imprinted thereon (e.g., a cardholder name, a card number, an expiration date, a card verification value (CVV)). Some cards may include a magnetic stripe (which may include a plurality of tracks), and the magnetic stripe may be configured to store sensitive information. Some cards may include a microchip (e.g., a Europay/Mastercard/Visa (EMV) chip) storing sensitive information. Some cards may include an RFID tag and/or a transponder device. Some cards may include some or all of these components.

According to some embodiments, device 100 may be configured to detect and/or identify the type of card received by card receiver 150. In some embodiments, image sensor 160 may capture image data of one or more portions of the received card. Image sensor 160 may transmit the captured image (i.e., the scan or photo taken by image sensor 160) to processor 110. Processor 110 may compare portions of the captured image to data saved in a card database, which may include images of known cards and/or textual identifiers of known cards (e.g., logos or card names), to determine the card type of the received card. In some embodiments, the card database may include information regarding the components (e.g., substrate, magnetic stripe, chip, RFID tag, a transponder device) included in various cards and/or may include information regarding the material composition of one or more components of the various cards. In some embodiments, the card database is saved locally in database 134.

In some embodiments, the card database is saved remotely in a remote storage device. For example, referring to FIG. 2, a card recycling system 200 can include a card recycler 100 may be configured to communicate (e.g., through communication interface 140) with card database 204 via network 202. Card database 204 may include information regarding the components included in various cards and/or information regarding the material composition of one or more components of the various cards, as described above. Network 202 may be of any suitable type, including individual connections via the internet such as cellular or Wi-Fi networks. In some embodiments, network 106 may connect terminals, services, and mobile devices using direct connections such as radio-frequency identification (RFID), near-field communication (NFC), Bluetooth™, Bluetooth™ low-energy (BLE), Wi-Fi™, ZigBee™ ambient backscatter communications (ABC) protocols or similar technologies, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security. Network 202 may comprise any type of computer networking arrangement used to exchange data. For example, network 202 may be the Internet, a private data network, virtual private network using a public network, and/or other suitable connection(s) that enables card recycler 100 to send and receive information with card database 204 or other devices. Network 202 may also include a PSTN and/or a wireless network. In some embodiments, network 202 may be a local network.

Referring back to FIG. 1, in certain embodiments, determining the card type of the received card may include determining whether any part of the received card includes recyclable materials. In certain embodiments, determining the card type of the received card may include determining whether the substrate of the received card includes recyclable materials. In certain embodiments, processor 110 may be configured to reject cards that do not include a predetermined number of recyclable components, amount of recyclable material, and/or type of component made from recyclable material. For example, in some embodiments, processor 110 may be configured to reject cards that do not have a substrate made from a recyclable material. In some embodiments, rejected cards may be ejected from card receiver 100. In some embodiments, rejected cards may be transported to a trash bin of physical storage 190. In certain embodiments, subsequent to a received card being rejected, processor 110 may cause a visual alert to be displayed on a display of card recycler 100 or an audible alert to be provided by a speaker of card recycler 100, and the alert may notify a user that the received card is rejected. In some embodiments, the alert may request a user input as to whether the user desires to discard the rejected card to the trash bin or whether the user desires for the card to be ejected from card receiver 150. In some embodiments, user input may be received from the U/I device, and processor 110 may be configured to, based on the received user input, transmit instructions to eject the rejected card or transport the rejected card to the trash bin.

Figure 2:
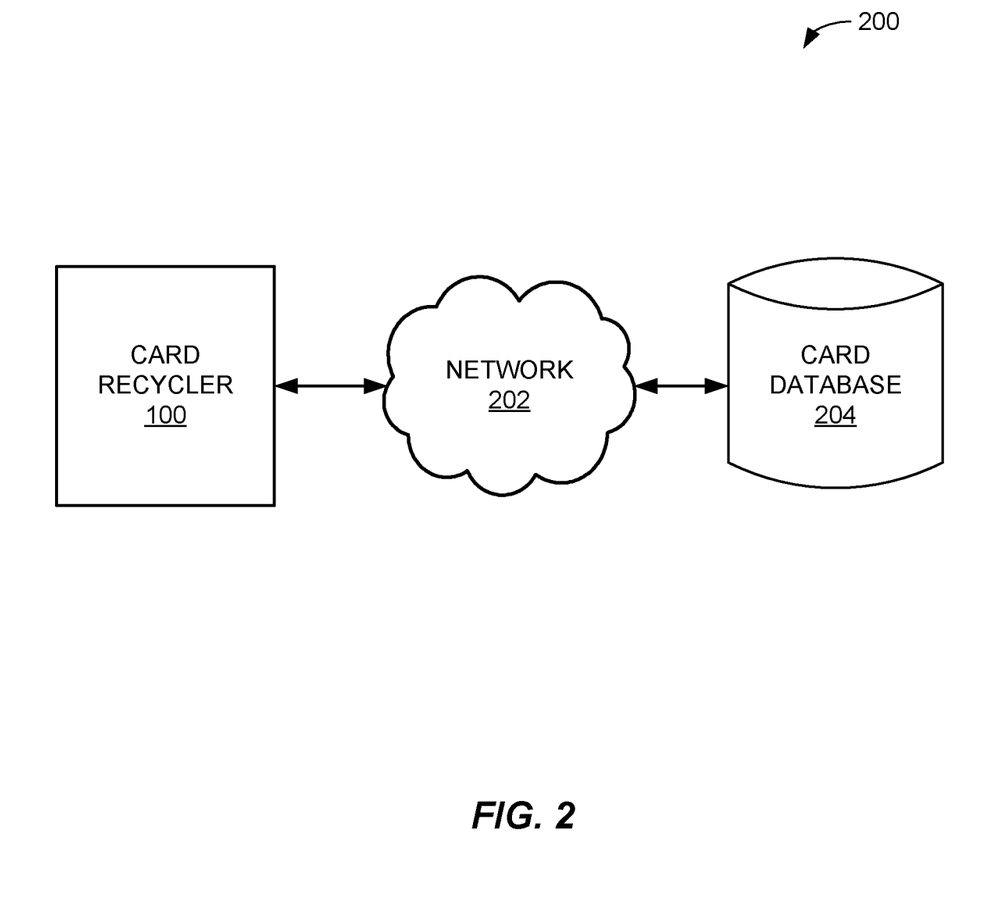
FIG. 2 is a diagram of a card recycling system, in accordance with some embodiments of the disclosed technology.

If the received card includes the predetermined number of recyclable component, amount of recyclable material, and/or type of component made from recyclable material, processor 110 may be configured to accept the received card. In some embodiments, image sensor 160 may be configured to scan one or more sides of the accepted card. Embodiments in which two sides of the accepted card can be scanned may enable card recycler 100 to identify the location of various components of the received card irrespective of the orientation in which a user inserted the card into card receiver 150. In some embodiments, processor 110 may be configured to identify the location (on the accepted card) of one or more components of the accepted card. In some embodiments, processor 110 may be configured to identify the location of one or more edges of one or more components of the accepted card. For example, processor 110 may be configured to determine whether the accepted card includes a magnetic stripe, a chip, an RFID tag, a transponder device, or other components. In some embodiments, as discussed above, this information may be received from card database 204 or another storage location. In some embodiments, processor 110 may be configured to identify the location of the magnetic stripe and/or the location of the edges of the magnetic stripe, chip, RFID tag, transponder device, or other components.

Separator 170 may be configured to separate components of the accepted cards. For example, separator 170 may remove the magnetic stripe, chip, RFID tag, transponder device, or other component from the substrate of the accepted card. In some embodiments, separator 170 includes a blade. In some embodiments, separator 170 includes a laser. In some embodiments, card recycler 100 includes a removal tool configured to scrape or pry loose a component from the substrate of the accepted card. In some embodiments, the removal tool is configured to scrape or pry loose a component from the substrate as separator 170 cuts along the border of a component. In some embodiments, separator 170 is configured to remove a portion of the substrate (e.g., a section of the substrate, one or more top layers of the substrate) that includes printed or imprinted sensitive information. For example, some cards, such as credit cards, include a user's name, a card number, and other information, which is printed or imprinted on the card, and separator 170 may be configured to cut out the portion of the substrate including the printed or imprinted information. Separator 170 may be configured to remove the entire section of the substrate (e.g., cut through the entire thickness of the substrate), and/or separator 170 may be configured to remove one or more layers of the substrate until the printed or imprinted information is no longer visible. In some embodiments, card recycler 100 may include a sander that includes sandpaper or another abrasive device, and the sander may be configured to remove one or more layers of the substrate until the printed or imprinted information is no longer visible. In some embodiments, a laser (e.g., separator 170) or another heat-producing device may be configured to melt the substrate proximate the location of the printed or imprinted information such that the printed or imprinted information is no longer readable. In some embodiments, card recycler 100 may include a grinder configured to remove and/or destroy components of the accepted cards via grinding.

Demagnetizer 180 may be configured to erase and/or demagnetize the magnetic stripe and chip cards such that sensitive information included in the magnetic stripe is erased. In some embodiments, demagnetizer 180 may be configured to demagnetize the magnetic stripe prior to separator 170 removing the magnetic stripe from the substrate. In some embodiments, the removed magnetic stripe may be transported to demagnetizer 180 after separator 170 removes the magnetic stripe from the substrate. In certain embodiments, demagnetizer 180 may be configured to demagnetize the removed magnetic stripe after magnetic stripe bin 190a receives the removed magnetic stripe. In certain embodiments, demagnetizer 180 may be configured to demagnetize all contents of magnetic stripe bin 190a every time magnetic stripe bin 190a receives a removed magnetic stripe. In some embodiments, demagnetizer 180 may be configured to demagnetize all contents of magnetic stripe bin 190a after magnetic stripe bin 190a receives a predetermined number of removed magnetic stripes or a predetermined amount of magnetic stripe material. In some embodiments, demagnetizer 180 may be configured to demagnetize the magnetic stripe as it is being transported. That is, in some embodiments, demagnetizer 180 may be positioned adjacent to, or surrounding, a path along which the magnetic stripe is transported. In some embodiments, demagnetizer 180 includes a magnet that repeatedly passes by the magnetic stripe. In some embodiments, demagnetizer 180 includes a stationary magnet and the magnetic stripe is repeatedly passed by the magnet.

In some embodiments, card recycler 100 may be configured to destroy or disassemble components storing sensitive information. For example, a chip (e.g., an EMV chip) may store sensitive information. In some embodiments, separator 170 may be configured to cut, shred, or otherwise render inoperable the chip. In some embodiments, a removed chip may be transported to a shredding device, which may be a mechanically shredding device, an acoustic shredder, or any other shredding device. In certain embodiments, the shredded chip may then be transported to chip bin 190b. In some embodiments, the removed chip may be rendered inoperable by being submerged in water or a chemical.

In certain embodiments, separator 170 may be configured to disassemble the removed chip into chip subcomponents and each chip subcomponent may be transported to corresponding bins of physical storage 190 according to the material composition of each chip subcomponent. In some embodiments, components (e.g., a chip) and/or subcomponents (e.g., a chip subcomponent) may be transported to a trash bin if that component or subcomponent is not made from a recyclable material. Other components may be disassembled or rendered operable as discussed above with respect to a removed chip.

In some embodiments, card recycler 100 may be configured to determine a material composition of the substrate. As explained above, in some embodiments, image sensor 160 may scan or take a photo of some or all of one or more faces of a card, and in some embodiments, processor 110 may execute OCR software to determine a textual identifier of the card. In some embodiments, processor 110 may transmit the detected image and/or textual identifier to card database 204, and processor 110 may receive, from card database 204, data indicative of a known material composition of the substrate of the card.

In some embodiments, card recycler 100 may include a chemical testing module that is configured to test a portion of the card to determine a material composition of the card. In some embodiments, separator 170 may be configured to remove a portion of the substrate for the chemical testing module to test. In some embodiments, the chemical testing module may be configured to test an already-removed portion of the substrate, such as a portion of the substrate that previously included printed or imprinted sensitive information. In some embodiments, the chemical testing module may be configured to test the card without removing a portion of the card.

In some embodiments, card recycler 100 may include an electron microscope, and the electron microscope may be configured to examine the substrate or a portion of the substrate to determine a likelihood that the card is made from a particular material. In some embodiments, card database 204 may include saved microscopic images corresponding to various material compositions, and processor 110 may be configured to receive a detected image from the electron microscope, compare the detected image to the saved microscopic images, and identify, based on the comparison, a material composition of the card. In some embodiments, processor 110 may be configured to identify a material composition of the card if the detected image is above a predetermined degree of similarity to a particular saved microscopic image. For example, in some embodiments, processor 110 may be configured to identify a card as being made from PVCA if the detected image is 90% (or more) similar to a saved microscopic image corresponding to PVCA. As another example, in some embodiments, processor 110 may be configured to identify a card as being made from PVC if the detected image is 51% (or more) similar to a saved microscopic image corresponding to PVC.

In some embodiments, card recycler 100 may include a measurement module, and the measurement module may be configured to measure a volume and a weight of the substrate. Processor 110 may be configured to determine a density of the substrate based on the measured volume and weight. Processor may be configured to compare the determined density to density data saved in card database 204 or another storage location. Based on the comparison, processor 110 may determine a material composition of the substrate. In some embodiments, card recycler 100 may be configured to employ one, some, or all of the methodologies discussed herein for identifying a material composition of a substrate.

In some embodiments, card recycler 100 may be configured to identify a material composition of a substrate only if all employed methodologies are in agreement. In some embodiments, card recycler 100 may be configured to identify a material composition of a substrate only if a predetermined number or ratio of the employed methodologies are in agreement. For example, if three methodologies are employed, card recycler 100 may be configured to determine that a substrate is made from a particular material only if at least two of the methodologies agree on a given material composition. In some embodiments, card recycler 100 may be configured to determine that a substrate is made from a particular material only if at least a predetermined number of employed methodologies determine at least a predetermined likelihood that a substrate is made from the particular material. For example, in some embodiments, card recycler 100 may be configured to determine that a substrate is made from PVCA only if at least two of the three employed methodologies determine that the substrate is at least 80% likely to be made from PVCA. In some embodiments, card recycler 100 will transport a substrate to the trash bin if one or more predetermined thresholds is not met. In some embodiments, card recycler 100 will transport a substrate to the trash bin if a predetermined number of employed methodologies (e.g., one methodology) determines that a substrate is less than a predetermined threshold of likelihood that a substrate is made from the particular material. For example, if three methodologies are employed and two methodologies determine that the substrate is 90% likely to be PVCA but the third methodology determines that the substrate is less than 50% likely to be PVCA, card recycler 100 may be configured to transport the substrate to the trash bin. In some embodiments, card recycler 100 may be configured to give different weight to determinations from different methodologies, such as more strongly favoring methodologies proven to more accurately identify the material composition of cards.

According to some embodiments, card recycler 100 may include a conveyer, a tube, or a pathway configured to transport the substrate to a substrate bin of physical storage 190 corresponding to the identified material composition of the substrate (e.g., bin 190c). In some embodiments, card recycler 100 may include a vacuum tube that is configured to transport the substrate via suction.

In certain embodiments, card recycler 100 may include a separate bin of storage portion 190 for substrates having different material compositions. For example, some embodiments may include a separate bin for substrates (or other components) made from plastic, metal, and/or ceramic. In some embodiments, card recycler 100 may include a separate bin for substrates made from different types of plastic (e.g., polyvinyl chloride acetate (PVCA), polyvinyl chloride (PVC), nylon), different types of metal (e.g., steel, aluminum), and/or different types of ceramic (e.g., oxides, non-oxides, composites). According to some embodiments, portions of the substrate previously removed from the substrate may be transported to a corresponding bin according to material composition, and these bins may be the same or different bins in which substrates are deposited. For example, shavings, shreds, or removed sections of substrate (e.g., material corresponding to portions of a substrate that previously included printed or imprinted sensitive information) may be moved to the same bin 190c that the substrate itself is transported. In some embodiments, shavings, shred, or removed sections of substrate may be transported to a different bin than the substrate itself, which may improve the efficiency of storage. That is, this may enable substrates to be stacked in a substrate bin 190c, while the shavings, shreds, or removed sections of substrate are moved to a different bin, even though the shavings, shreds, or removed sections of substrate may be made from the same material as the substrate itself.

Subsequent to separator 170 and/or other devices or components removing a component from a substrate, the removed component may be moved to a corresponding bin of physical storage 190. According to some embodiments, card recycler 100 may include a conveyer, a tube, or a pathway configured to transport a card or components of a card to various locations, components, or devices of card recycler 100. In some embodiments, card recycler 100 may include a vacuum tube that is configured to transport a card or card component via suction. In certain, embodiments, a suction device may be configured to engage a card or component by applying suction to the card or component. The suction device may be configured to move the card or component to a desired location to and release the card or component by releasing suction. In some embodiments, card recycler 100 may be configured to transport removed magnetic stripes to demagnetizer 180 and/or to a magnetic stripe bin of physical storage 190 (e.g., bin 190a). In some embodiments, card recycler 100 may be configured to transport removed chips to a chip bin of physical storage 190 (e.g., bin 190*b*). In some embodiments, card recycler 100 may be configured to transport substrates to a substrate bin of physical storage 190 corresponding to the identified material composition of the substrate (e.g., bin 190*c*).

According to some embodiments, card recycler 100 is incorporated or integrated into another device. For example, referring to FIG. 3, card recycler 100 may be included in an ATM 300. ATM 300 may include all of the functionalities traditionally provided by ATMs (e.g., viewing account information and withdrawing, depositing, and/or transferring funds). ATM 300 may include some or all of the components and/or functionalities of card recycler 100 as disclosed herein. In some embodiments, components traditionally included in ATMs may exist and function separately from the components and functionalities the provide the functionality of one or more components of card recycler 100. For example, card recycler 100 may be included in ATM 300, but card recycler 100 may include its own dedicated card receiver 150, while ATM 300 may include a separate and distinct card receiver for performing traditional ATM functionalities.

Figure 3:
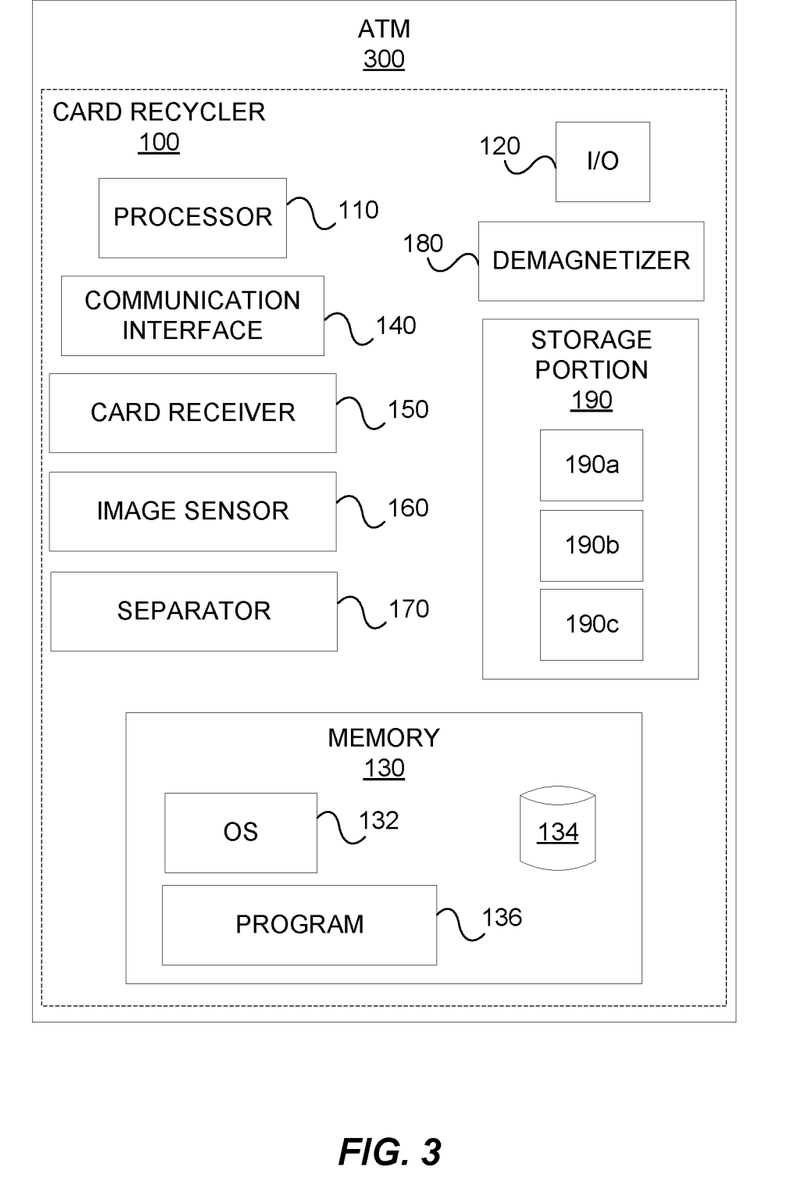
FIG. 3 is a diagram of an automated teller machine (ATM) including a card recycling device, in accordance with some embodiments of the disclosed technology.

In some embodiments, components traditionally included in ATMs may provide the functionality of one or more components of card recycler 100. For example, in some embodiments, ATM 300 may include a single card receiver 150. Card receiver 150 may be configured to receive a card and detect whether the received card corresponds to an active financial account. ATM 300 may be configured to detect whether the received card corresponds to an active financial account via image sensor 160, one or more sensitive information reading devices (e.g., a magnetic stripe reader, an EMV chip reader), or any combination thereof. If the received card does correspond to an active financial account, ATM 300 may request input from the user. For example, ATM 300 may communicate (e.g., via a visual display and/or an audible alert) to the user a request for input regarding whether the user intends to access his or her account or whether the user intends to recycle the card. User input may be received from a U/I device of the ATM 300. In some embodiments, ATM 300 may require a user to enter a personal identification number (PIN) or other authorization information prior to recycling a card corresponding to an active financial account. If the received card does not correspond to an active financial account, ATM 300 may communicate to the user a request for input regarding whether the user intends to recycle the card. Responsive to receiving input from the user indicating that the user intends to recycle the card, ATM 300 may be configured to perform some or all of the functionalities discussed herein.

Figure 4:
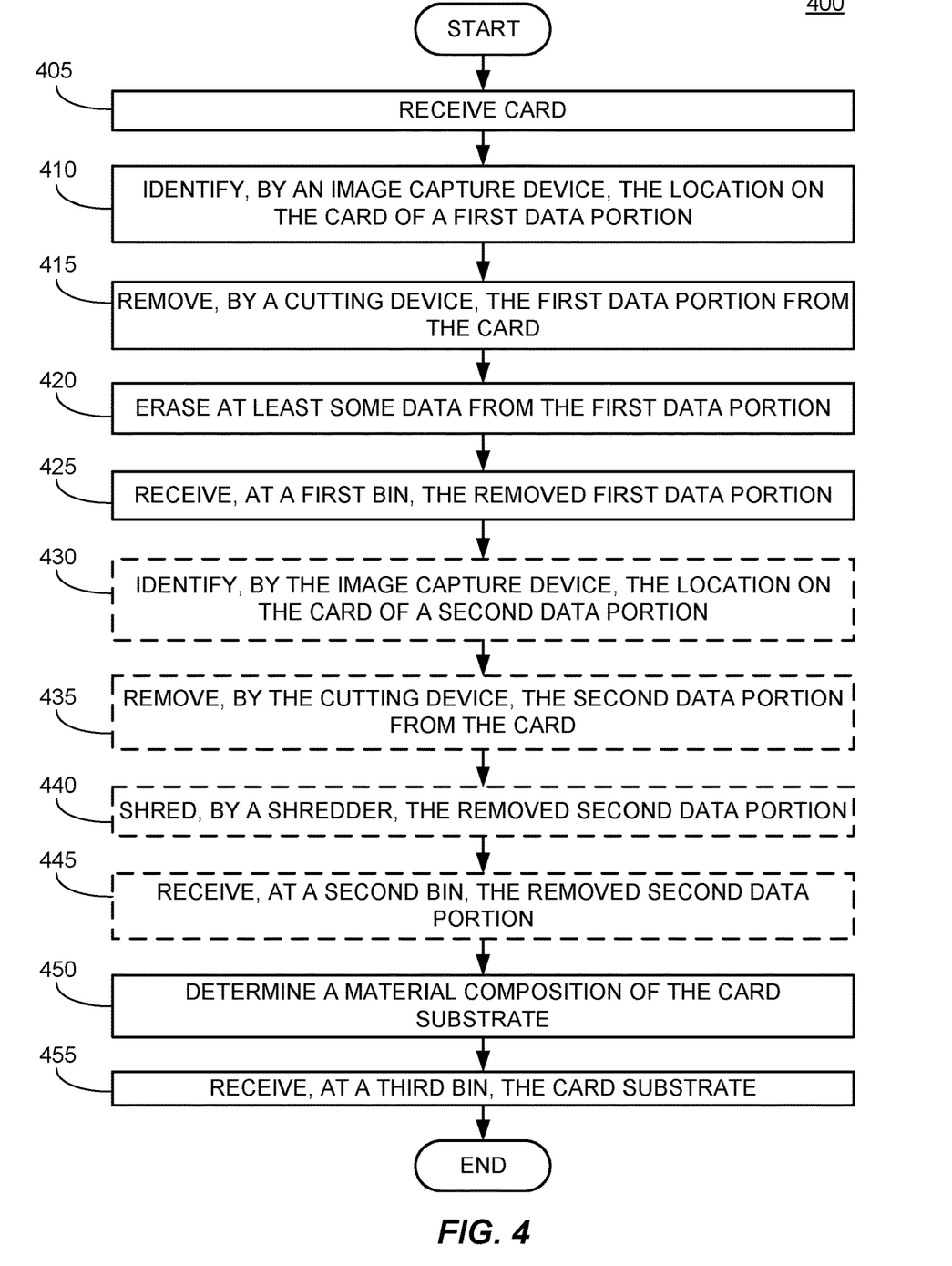
FIG. 4 is a flowchart showing operation of a card recycling device, in accordance with some embodiments of the disclosed technology.

Referring to FIG. 4, a flowchart of an example method 400 for facilitating the recycling of a card is provided. Method 400 may be performed by some or all of components, subcomponents, and/or functionalities of card recycler 100.

In block 405, card recycler 100 may receive a card. In block 410, card recycler 100 may identify, by an image capture device (e.g., image sensor 160), the location on the card of a first data portion. In some embodiments, the first data portion may be a magnetic stripe. In some embodiments, the first data portion may be a chip (e.g., an EMV chip). In some embodiments, the first data portion may include information that is printed or imprinted on the card. In block 415, card recycler 100 may remove, by a cutting device (e.g., separator 170), the first data portion from the card. In block 420, card recycler 100 may erase at least some data from the first data portion. If the first data portion is a magnetic stripe, card recycler 100 may demagnetize (e.g., via demagnetizer 180) the magnetic strip. If the first data portion is a chip, card recycler 100 may cutting, shredding, disassembling, or otherwise rendering inoperable the chip. If the first data portion is printed or imprinted information, card recycler 100 may cut, sanding, or melting the portion of the card that includes that printed or imprinted information. In block 425, card recycler 100 may receive, at a first bin (e.g., bin 190*a*), the removed first data portion.

In block 430, card recycler 100 may identify, by the image capture device, the location on the card of a second data portion. In some embodiments, the second data portion may be a magnetic stripe. In some embodiments, the second data portion may be a chip (e.g., an EMV chip). In some embodiments, the second data portion may be information that is printed or imprinted on the card. In block 435, card recycler 100 may remove, by the cutting device, the second data portion from the card. In block 440, card recycler 100 may shred, by a shredder (e.g., separator 170) the removed second data portion. In block 445, card recycler 100 may receive, at a second bin (e.g., bin 190*b*), the removed and shredded second data portion.

In block 450, card recycler 100 may determine a material composition of the card substrate. In some embodiments, card recycler 100 may implement some or all of the material composition identification methodologies discussed herein. For example, card recycler 100 may capture an image (e.g., via a camera and/or an electron microscope) of one or more sides of the card, execute of OCR software on an image of one or more sides of the card, compare a detected image and/or a textual identifier of the card to a card database (e.g., card database 204), perform chemical testing of the card substrate, measure a volume and weight of the card substrate to calculate a density of the substrate, compare the calculated density to saved densities in a card database (e.g., card database 204), or any useful combination thereof. In block 455, card recycler 100 may receive, at a third bin (e.g., bin 190*c*), the card substrate.

Figure 5:
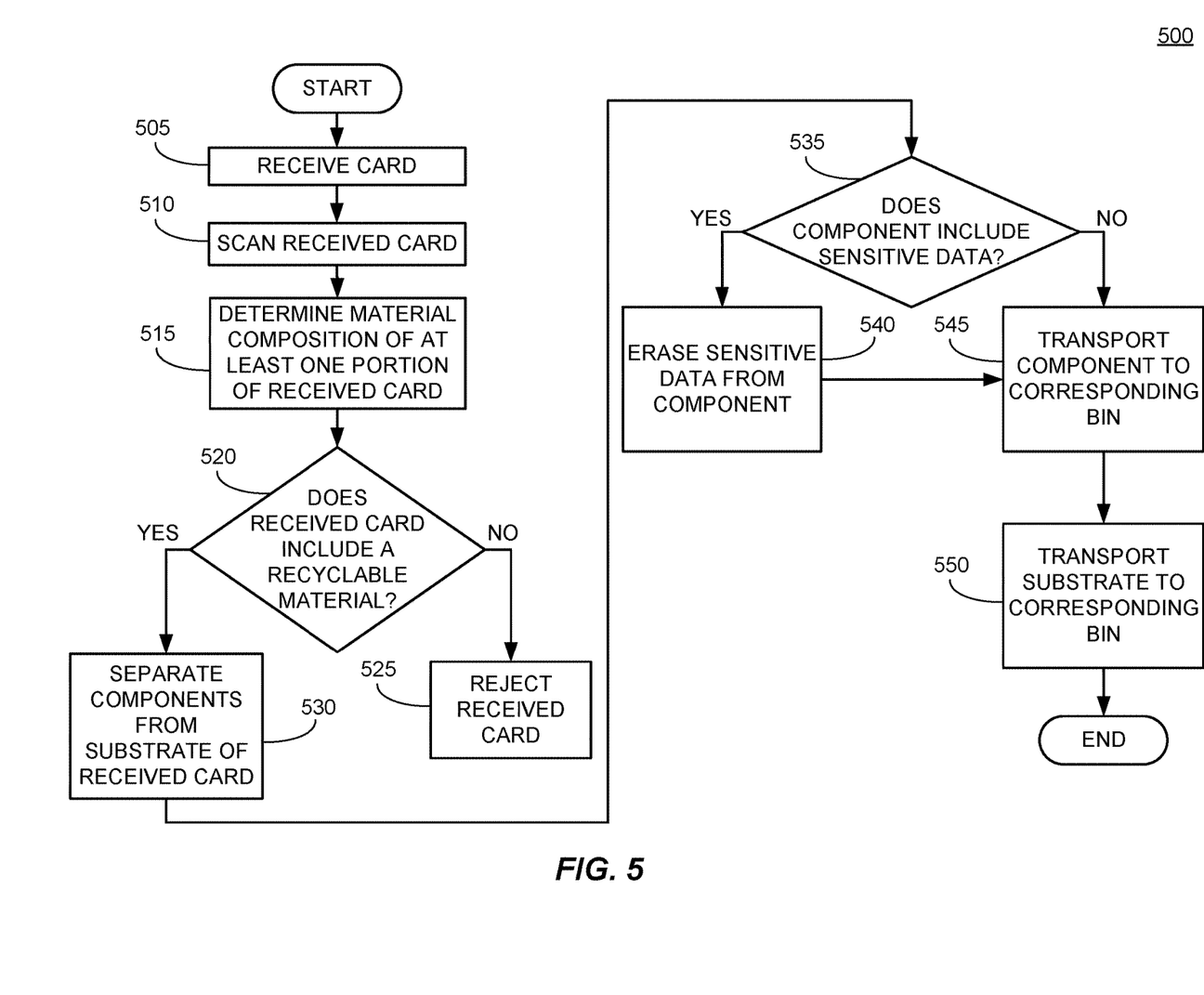
FIG. 5 is a flowchart showing operation of a card recycling device, in accordance with some embodiments of the disclosed technology.

Referring to FIG. 5, a flowchart of an example method 500 for facilitating the recycling of a card is provided. Method 500 may be performed by some or all of components, subcomponents, and/or functionalities of card recycler 100.

In block 505, card recycler 100 may receive a card (e.g., by card receiver 150). In block 510, card recycler 100 may scan the received card (e.g., via image sensor 160). As discussed above, the captured image data may be used to identify the received card, which may be used to identify the material composition of one or more components of the received (e.g., by comparing the captured image data to stored data, such as in card database 204), and/or the captured image data may be used to determine the location of one or more components of the received card for subsequent removal. In block 515, card recycler 100 may determine a material composition of at least one portion of the received card. For example, card recycler 100 may compare captured image data to stored data (e.g., data stored in card database 204), perform chemical testing of one or more components, capture electron electroscope images of one or more components and compare to stored microscopic image data (e.g., (e.g., data stored in card database 204), and/or compare a calculated density of one or more components to stored density data (e.g., data stored in card database 204).

In decision block 520, card recycler 100 may determine whether the received card includes a recyclable material. In some embodiments, card recycler 100 may determine whether the received card includes a recyclable material based at least in part on one or more of the above-discussed material identification methodologies. As shown in block 525, if card recycler determines that the received card does not include a recyclable material, card recycler 100 may reject the received card. Card recycler 100 may reject the received card by transporting the received card to a trash bin, or card recycler 100 may reject the received card by ejecting the received card so as to return the card to a user of the card recycler. As shown in block 530, if card recycler determines that the received card does include a recyclable material, card recycler 100 may separate (e.g., by separator 170) one or more components from the substrate of the received card. For example, card recycler may remove a magnetic stripe, a chip, and/or information printed or imprinted on the substrate.

In decision block 535, card recycler 100 may determine whether each of the components includes sensitive data (or is configured to include sensitive data). As shown in block 540, if card recycler 100 determines that a component includes or could include sensitive data, card recycler 100 may remove or erase the sensitive data from the component. For example, card recycler 100 may erase or demagnetize (e.g., by demagnetizer 180) a magnetic stripe or chip or may cut, shred, grind, melt, or sand a magnetic strip, a chip, or information printed or imprinted on a substrate. In block 545, card recycler 100 may transport each component to a corresponding bin, where each bin may be associated with a particular material composition or type of component. In addition, if card recycler 100 determines (e.g., in decision block 535) that a component does not include or could not include sensitive data, card recycler 100 may transport each component to the corresponding bin. In block 550, card recycler 100 may transport the substrate to a corresponding bin. Card recycler 100 may include a separate bin for substrates made from different materials. For example, card recycler 100 may include a separate bin for substrates made from plastics, metal, ceramics, other types of materials, or variations thereof. Card recycler 100 may include a separate bin for any number of different types of plastic (e.g., PVCA, PVC, nylon), different types of metal (e.g., steel, aluminum), and/or different types of ceramic (e.g., oxides, nonoxides, composites).

Certain embodiments and implementations of the disclosed technology may be described above with reference to block and flow diagrams of systems and according to example embodiments or implementations of the disclosed technology. It will be understood that some blocks of the block diagrams and flow diagrams may not necessarily need to be performed in the order presented, may be repeated, or may not necessarily need to be performed at all, according to some embodiments or implementations of the disclosed technology. One of ordinary skill will understand that the order of certain elements of the block diagrams and flow diagrams may be altered unless explicitly required to operate in a particular order. Accordingly, blocks of the block diagrams and flow diagrams support combinations of means for performing the specified functions, and combinations of elements or steps for performing the specified functions.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Case

The following example use case describe an example of a typical implementation of the use of a device for facilitating the recycling of a card (e.g., card recycler 100). This is intended solely for explanatory purposes and not for purposes of limitation. A user can insert a card, such as a payment card, into a card receiver (e.g., card receiver 150)

of the card recycler. The user can instruct the device to facilitate recycling of the payment card (e.g., via a U/I device of the card recycler).

The card recycler can determine whether the received payment card includes any recyclable material. The card recycler can take an image via a camera (e.g., image sensor 160) of the front side and/or back side of the payment card for identifying a card type of the payment card. The card recycler can compare the captured image to a database of saved images (e.g., card database 204) to determine a card type of the payment card. In some cases, the card recycler can execute OCR to generate a textual identifier of the card, which, in addition to or in lieu of the captured image, can be compared to a database (e.g., card database 204) to determine a card type of the payment card. For example, if the captured image and/or textual identifier of a card corresponds to a saved image and/or saved textual identifier for a Capital One Quicksilver credit card, the card recycler may identify the payment card as having a substrate made of PVC. As another example, if the captured image and/or textual identifier of a card corresponds to a saved image and/or saved textual identifier for a Chase Sapphire Reserve credit card, the card recycler may identify the payment card as having a substrate made of metal. In some cases, the card recycler can identify a material composition of one or more portions of the received payment card by chemically testing one or more portions of the received card, capturing electron microscope images of one or more portions of the received payment card and comparing the captured image(s) to saved images (e.g., saved in card database 204), and/or calculating a density of the received payment card based on a measured volume and weight and comparing the density to saved densities (e.g., saved in card database 204).

The card recycler can remove from the payment card a magnetic stripe, a chip, printed or imprinted data, or other components including sensitive data (e.g., via separator 170). The card recycler can delete sensitive data from the removed component(s) and/or can destroy the removed component. For example, the card recycler can demagnetize (e.g., via demagnetizer 180) a removed magnetic stripe and/or can shred, sand, melt disassemble, or otherwise destroy or render inoperable a chip and/or printed or imprinted data.

The card recycler can separate the various components and subcomponents according to material type or component type and can transport each component or subcomponent to a corresponding bin (e.g., bins 190*a*, 190*b*, 190*c* of storage portion 190). If any portion of the received payment card is not recyclable, the card recycler can return the received payment card (in its entirety) to the user, or the card recycler can transport the non-recyclable portions of the received payment card to a trash bin.

What is claimed is:

1. A method for facilitating recycling of a card via a recycling receptacle, the method comprising:
   receiving the card at the recycling receptacle, the card comprising a substrate, a first data portion, and a second data portion;
   receiving, from an image capture device of the recycling receptacle, image data associated with the card;
   automatically identifying, based at least in part on the image data, a first location on the substrate associated with the first data portion and a second location on the substrate associated with the second data portion;
   outputting instructions for a separating device of the recycling receptacle to remove the first data portion and the second data portion from the substrate such that the substrate remains substantially intact;
   determining a material of the substrate;
   determining that the material of the substrate matches a material associated with a third bin of the recycling receptacle; and
   outputting instructions for an internal transport system of the recycling receptacle to (i) transport the removed first data portion to a first bin of the recycling receptacle, (ii) transport the removed second data portion to a second bin of the recycling receptacle, and (iii) transport the substrate to the third bin such that the substrate is positioned in the third bin in a flat configuration.

2. The method of claim 1 further comprising outputting instructions for erasing, by the recycling receptacle, at least some data from the first data portion.

3. The method of claim 2, wherein the first data portion comprises a magnetic stripe and outputting the instructions for erasing the at least some data from the first data portion comprises outputting instructions for demagnetizing, by a demagnetizer of the recycling receptacle, the magnetic stripe.

4. The method of claim 1 further comprising outputting instructions for shredding, by a shredder of the recycling receptacle, the second data portion.

5. The method of claim 1, wherein the second data portion comprises information indicative of at least one of a cardholder name, a card number, an expiration date, or a card verification value (CVV).

6. The method of claim 1 further comprising:
   automatically identifying, based at least in part on the image data, a third location of a third data portion comprising visible text or numerals;
   outputting the instructions for the separating device to remove the third data portion from the card;
   outputting the instructions for the separating device to shred the third data portion; and
   outputting the instructions for an internal transport system of the recycling receptacle to transport the shredded third data portion to a fourth bin of the recycling receptacle.

7. The method of claim 6, wherein the third data portion comprises a Europay/Mastercard/Visa (EMV) chip, the method further comprising cutting the EMV chip.

8. A device for facilitating recycling of a card, the device comprising:
   a card receiver configured to receive the card comprising (i) a substrate comprising a material and (ii) an information-saving component;
   an image capture component configured to identify a location on the substrate at which the information-saving component is located;
   a separating component configured to selectively remove the information-saving component from the substrate such that the substrate remains substantially intact;
   an internal transport system configured to transport the substrate and the information-saving component within the device;
   a plurality of substrate bins, each substrate bin being configured to receive card substrates in a flat and stacked configuration, the plurality of substrate bins comprising a first substrate bin configured to receive card substrates comprising a first material and a second substrate bin configured to receive card substrates comprising a second material;

a component bin configured to receive the information-saving component; and a controller comprising a processor and memory, the controller being configured to:
- receive image data from the image capture component;
- identify a location on the substrate of the information-saving component;
- output instructions for the separating component to remove the information-saving component from the substrate;
- determine that the material of the substrate is the first material;
- determine that the first substrate bin corresponds to the material of the substrate; and
- output instructions for the internal transport system to deposit the information-saving component into the component bin and the substrate into the first substrate bin.

9. The device of claim 8 further comprising a demagnetization device, wherein the information-saving component is a magnetic stripe and the demagnetization device is configured to demagnetize the magnetic stripe.

10. The device of claim 8, wherein the information-saving component is a Europay/Mastercard/Visa (EMV) chip.

11. The device of claim 10, wherein the separating component is configured to at least partially deconstruct the EMV chip and the component bin is a first component bin configured to receive a first subcomponent of the EMV chip, the device further comprising a second component bin configured to receive a second subcomponent of the EMV chip.

12. The device of claim 8, wherein the separating component comprises a laser.

13. The device of claim 8, wherein:
the information-saving component is a first information-saving component,
the component bin is a first component bin, and
the separating component is further configured to selectively remove a second information-saving component of the card from the substrate, the device further comprising a second component bin configured to receive the second information-saving component.

14. The device of claim 8, wherein identifying the material of the substrate comprises:
identifying, based on the image data, a financial service provider associated with the card; and
determining, based at least in part on the financial service provider associated with the card, a material composition of the card.

15. The device of claim 8 further comprising a trash bin, wherein the controller is further configured to:
identify a non-recyclable portion of the card;
output instructions for the separating component to remove the non-recyclable portion from the substrate; and
output instructions for the internal transport system to deposit the non-recyclable portion in the trash bin.

16. The device of claim 8, wherein the controller is further configured to:
determine whether the card comprises at least a predetermined amount of recyclable material; and
in response to determining that the card comprising an amount of recyclable material that is less than the predetermined amount of recyclable material, reject the card.

* * * * *